United States Patent [19]

Unwin et al.

[11] 4,043,370
[45] Aug. 23, 1977

[54] SEAL ARRANGEMENT FOR AN OVAL TIRE AND RIM

[75] Inventors: William B. Unwin; John J. Groezinger; Charles E. Grawey, all of Peoria, Ill.

[73] Assignee: Caterpillar Tractor Co., Peoria, Ill.

[21] Appl. No.: 652,260

[22] Filed: Jan. 26, 1976

[51] Int. Cl.² .............................................. B60C 19/00
[52] U.S. Cl. ................................ 152/354; 152/362 R; 152/429
[58] Field of Search .................... 152/362 R, 365–367, 152/371, 379 R, 381 R, 405, 427, DIG. 9, 429, 430, 354, 363, 364; 301/97, 98

[56] References Cited
U.S. PATENT DOCUMENTS

| 1,654,380 | 12/1927 | Michelin | 152/381 R |
| 2,563,787 | 8/1951 | Keefe | 152/427 |
| 2,680,463 | 6/1954 | Khalil | 152/339 |
| 2,825,383 | 3/1958 | Spelman | 152/362 R |
| 2,884,041 | 4/1959 | Mullen | 152/367 |
| 3,606,921 | 9/1971 | Grawey | 152/354 |

FOREIGN PATENT DOCUMENTS 1,002,210   2/1957   Germany .............................. 152/366

Primary Examiner—Robert B. Reeves
Assistant Examiner—H. Grant Skaggs
Attorney, Agent, or Firm—Charles E. Lanchantin, Jr.

[57] ABSTRACT

A seal arrangement for an oval tire and rim is disclosed including an oval tire having an annular base with a radially inner mounting surface and an air inlet passage therethrough, a supporting rim having a radially outer mounting surface disposed in facing relation with the inner mounting surface of the tire and with a valve opening therethrough alignable with the inlet passage, and a raised sealing device is localizably associated with one of the mounting surfaces for preventing the escape of pressurized air from the inlet passage and outwardly between the tire and the rim.

6 Claims, 9 Drawing Figures

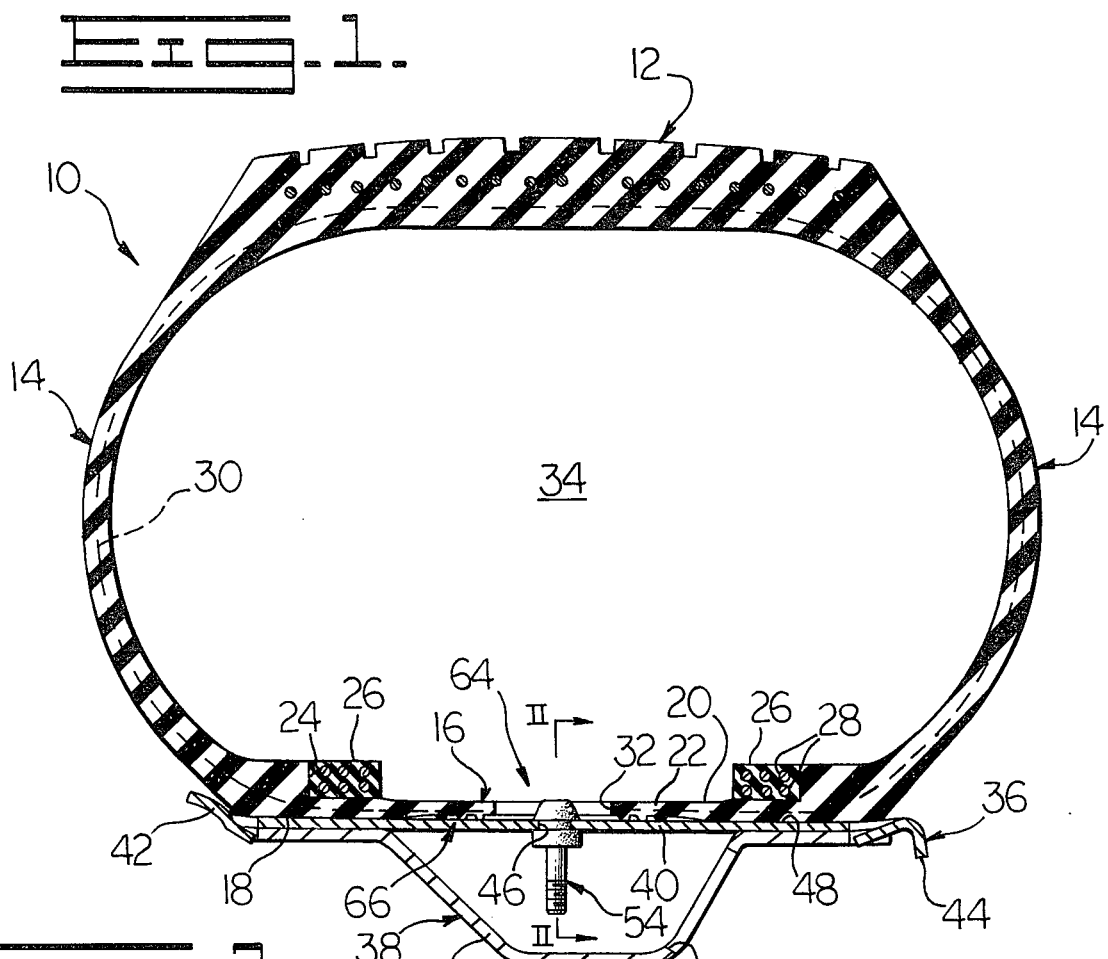
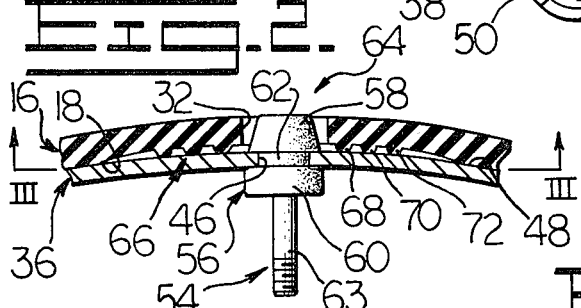
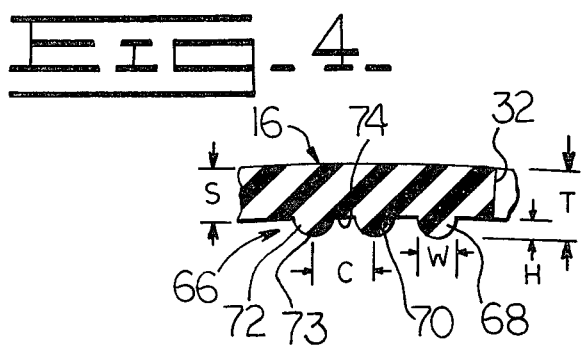
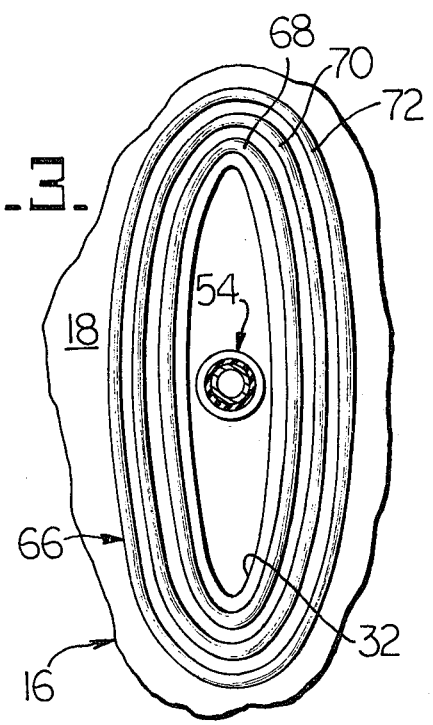

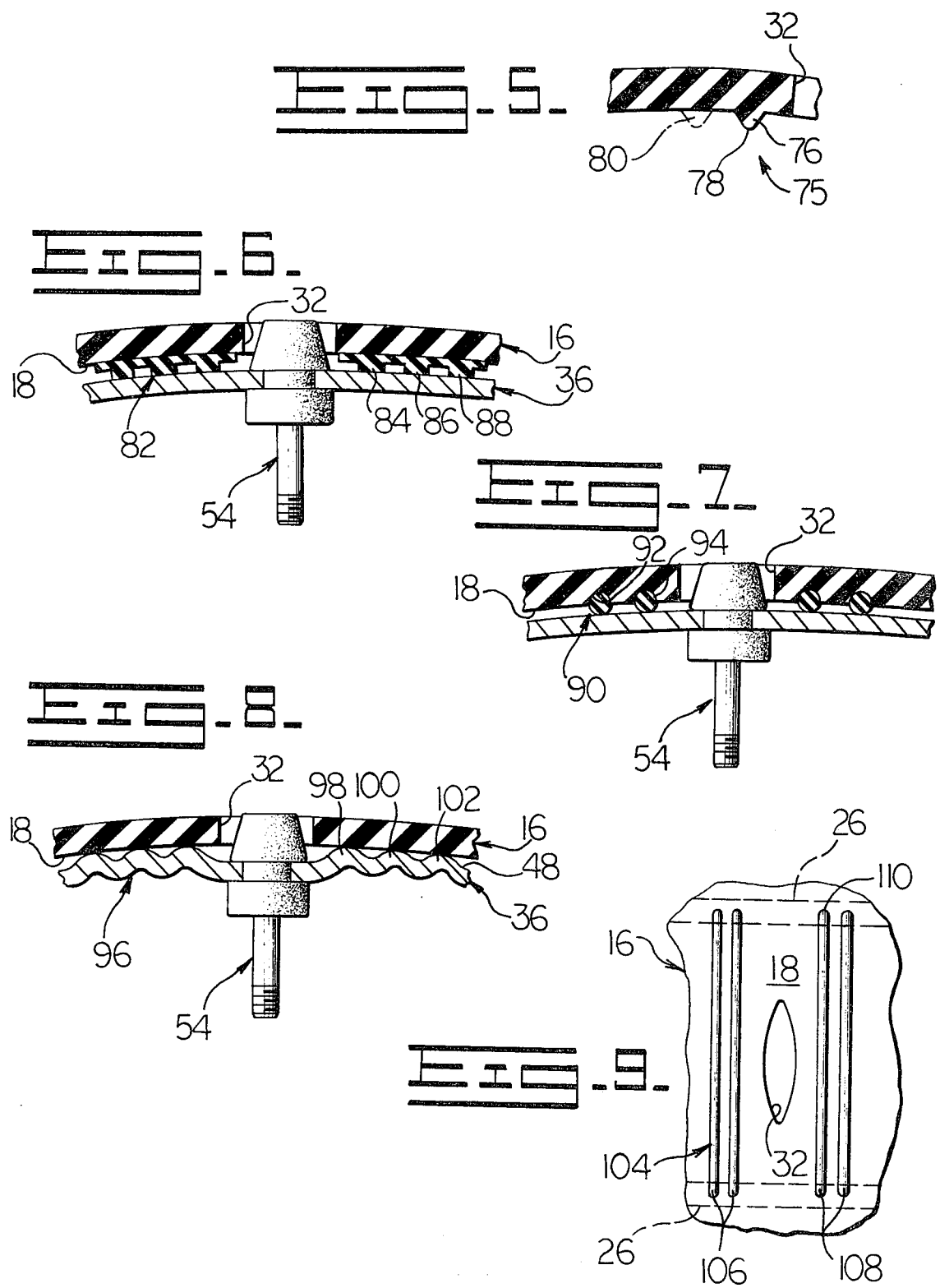

SEAL ARRANGEMENT FOR AN OVAL TIRE AND RIM

BACKGROUND OF THE INVENTION

Pneumatic tires of open center, hollow toroidal construction are well known to every automobile tire customer. These tires are generally horseshoe-shaped in cross-section and employ two axially spaced apart circular beads located at the radially inner limits of the sidewalls to effect sealing engagement with the wheel mounting rim. The rim is of relatively thin sheet metal and a conventional valve stem is sealingly anchored in a central hole therethrough to allow pressurized air to be delivered to, or removed from the internal chamber of the tire. An example of this conventional tire construction is disclosed in U.S. Pat. No. 3,804,141 issued Apr. 16, 1974 to F. Huttner.

However, the sealing problems associated with the installation of a fully oval pneumatic tube-tire on a supporting rim are entirely different. For one thing these oval tires do not have circular beads for sealing engagement radially against the rim seats and axially against the radially extending peripheral flanges. For another, these oval tires have a generally flat or gently axially arcuate radially inner base which is supported by a rim of corresponding minimal contour. Exemplifying these distinctions are the various oval and rim configurations disclosed in U.S. Pat. No. 3,606,921 issued Sept. 21, 1971 to C. E. Grawey, and assigned to the assignee of the present invention.

Heretofore, as far as is known, valve stems have been effectively constructed as only an integral part of these tubeless oval tires. Typically, an insert having an integral valve stem or threaded valve stem fitting is vulcanizably molded into the base of the tire as a part of the manufacturing process. This is a relatively costly manufacturing step, and the inert usually protrudes radially inward so that it undesirably affects the assembly procedure for installing the tire on the rim. Then too, proper caution must be taken to precisely radially align the valve stem with the valve opening through the rim during the assembly of the oval tire.

If, on the other hand, an inlet passage in the base of the oval tire is aligned with a valve opening in the rim, and a valve stem is subsequently installed sealingly solely in the opening, the manufacture and installation of the tire would be a much simpler and more economical procedure. While this advantageously permits a conventional automobile tire valve stem to be used which would be serviceable independently of the tire, it raises the primary problem of a potential air leakage path through the unsealed air inlet passage and outwardly between the base of the oval tire and the supporting rim. Particularly, circumferential leakage becomes a major consideration when split rims or multi-sectional rims are utilized because air may escape at any gap therebetween. With these sealing problems solved, an economical and effective valve stem entry zone can be provided.

SUMMARY AND OBJECTS OF THE INVENTION

Accordingly, it is an object of the present invention to provide an improved seal arrangement for an oval tire to prevent air escape between the tire's base and the supporting rim at the valve stem entry zone.

It is another object of the invention to provide such an improved seal arrangement which will permit convenient installation of the tire on the rim, and will be adaptable to the subsequent installation of a serviceable valve stem on the rim.

It is another object of the invention to provide a seal arrangement of the character described which would contribute to the simplicity and low cost construction of the tire while still assuring reliable sealing thereof.

Other objects and advantages of the present invention will become more readily apparent upon reference to the accompanying drawings and following description.

BRIEF DESCRIPTION OF THE DRAWINGS

FIG. 1 is a fragmentary cross sectional view of the oval tire and rim seal arrangement of the present invention as taken through the central axis of the tire and showing only the upper half thereof for illustrative convenience.

FIG. 2 is an enlarged, fragmentary sectional view of the valve stem entry zone taken along the line II—II of FIG. 1.

FIG. 3 is an enlarged, fragmentary plan view of the rim mounting surface of the tire showing a raised sealing device thereon in accordance with the present invention and looking radially outwardly along the line III—III of FIG. 2.

FIG. 4 is a further enlarged, fragmentary sectional view of the raised sealing device shown in FIG. 2 to better illustrate details of construction thereof.

FIG. 5 is an enlarged, fragmentary sectional view of the first alternate embodiment raised sealing device somewhat comparable to FIG. 4.

FIG. 6 is an enlarged, fragmentary sectional view of the valve stem entry zone comparable to FIG. 2, only showing the second alternate embodiment raised sealing device of the present invention.

FIG. 7 is an enlarged, fragmentary sectional view similar to FIG. 6, only showing the third alternate embodiment raised sealing device. FIG. 8 is an enlarged, fragmentary sectional view similar to FIG. 7, only showing the fourth alternate embodiment raised sealing device.

FIG. 9 is a diagrammatic, fragmentary plan view of the rim mounting surface of the tire comparable to FIG. 3, only showing the fifth alternate embodiment raised sealing device of the present invention.

DESCRIPTION OF THE PREFERRED EMBODIMENT

Referring now to FIG. 1, a hollow toroidal or oval pneumatic tire 10 is shown as having an outer peripheral tread portion 12, a facing pair of arcuately-shaped sidewalls 14 and a radially inner annular base 16. The base of the tire has a radially inner rim mounting surface 18 thereon and a radially outer chamber facing surface 20 which provides a relatively thin tubular section 22 centrally thereof. Adjacent the intersection of this tubular section and each of the sidewall the tire section is somewhat thicker and internally profiled to provide an annular step or groove 24 for receiving a pair of axially spaced annular restraining devices or roll restraining hoops 26. These hoops are essentially elastomeric rings with a plurality of relatively inextensible reinforcement filaments or circumferentially wrapped wires 28 wound therethrough so that they are substantially nonexpendable. The remainder of the tire is likewise made of one or more elastomeric materials and, preferably, a plurality of substantially inextensible filaments or radially wrapped elements 30 are helically wound therethrough. Such general oval tire construction is disclosed in greater detail in aforementioned U.S. Pat. No. 3,606,921.

In accordance with the present invention, however, at least one air inlet passage 32 is formed in the base 16 of the oval tire 10. And, in addition to its providing a path for pressurizing an internal air chamber 34, the axially elongated inlet passage is advantageously utilized as a path for removal of core forming materials after the tire is vulcanized into an integral unit.

As is clearly apparent in FIG. 1, the oval tire 10 is mounted on a supporting rim 36 which is suitably secured to a center member or wheel mounting assembly 38. The relatively thin steel rim is preferably transversely split for assembly purposes, and includes a substantially cylindrical central body portion 40 with a radially outwardly extending integral flange 42 axially inboard thereof and a radially inwardly extending integral rolled edge 44 axially outboard thereof. Upon inspection of both FIGS. 1 and 2, it will be seen that a valve opening 46 is formed centrally through the rim which opens outwardly on a radially outer tire engaging or mounting surface 48. Such valve opening is generally axially and radially aligned with the air inlet passage 32 formed in the tire. Furthermore, the center member 38 also has a concave central porton 50 with a valve stem access aperture 52 formed therethrough which is circumferentially aligned with the inlet passage and the valve opening.

In accordance with one aspect of the invention, a conventional valve stem member 54 is sealingly engaged within the valve opening 46 of the supporting rim 36. Such a valve stem member is manufactured, for example, by Scovill Manufacturing Company of Dickson, Tenn. The valve stem member preferably includes an elastomeric radially outer end 56 having a conical head 58, a centrally disposed cylindrical body 60 and an annular neck or recess 62 therebetween which is tightly received sealingly in the rim opening. A cylindrical metal valve stem mechanism 63 of the usual displaceable check valve type extends centrally through the elastomeric radially outer end of the member to permit pressurized air to be supplied therethrough to the chamber 34. While a typical pressure of from 2.11 to 3.16 kg per sq. cm (30 to 45 psi) may be desired in the tire, pressures twice this level may be experienced.

Collectively then, the aligned oval tire 10, the supporting rim 36, and the wheel mounting assembly 38 provide a valve stem entry zone 64 at the valve stem member 54. An infinite number of potential air escape routes extend away from the air inlet passage 32 and valve stem member between the tire and the rim, and in accordance with the present invention, a seal arrangement or raised sealing device which is generally identified by the reference numeral 66 is localizably associated with one of the facing mounting surfaces 18 and 48 to prevent leakage thereat.

Preferably, as is shown best in FIGS. 2 and 3, the preferred embodiment raised sealing device 66 includes several raised or elevated sealing ridges such as are indicated by the reference numerals 68, 70 and 72 which ae integrally formed in the tire's base 16. As is apparent, these sealing ridges are juxtaposed encircling or somewhat elliptically around the air inlet passage 32 in substantially equally spaced apart relation. These concentrically disposed ridges have arcuate or semicylindrical crests 73 as shown more clearly in FIG. 4 and present an overall thickness (T) which is greater than the relatively uniform thickness (S) of the tubular section 22 of the tire by approximately 25 percent. In the instant embodiment, the width (W) of each ridge is 2.4 mm (0.094"), the height (H) from the roots of the recesses 74 formed between them is substantially the same distance, and the cycle width (C) is approximately twice such distance.

In accordance with one aspect of the invention, the substantially concentric nature of the raised sealing ridges 68, 70 and 72 reduces the total localized support surface of the oval tire which makes contact with the supporting rim 36. Such reduction in contacting surface area, for example, from approximately 58 sq. cm (9 sq. inches) total exposed pressure surface on the chamber side of the base 16 to approximately 6.45 sq. cm (1 sq. inch) collectively from the crests 73 of the sealing ridges, theoretically multiplies the unit pressure on the sealing ridges by that ratio. With such ratio, if the air pressure within the tire is 3.16 Kg per sq. cm (45 psi) then the unit pressure on the ridges would be in the order of 28.12 Kg per sq. cm (400 psi). In actual practice, the unit pressure of the sealing ridges might be more conservatively in the range of from 2 to 4 times that of the pressure in the chamber 34 according to the specific profile selected.

Thus, it is apparent that the raised sealing device 66 of the present invention provides an increased unit pressure at the crests 73 of the sealing ridges 68, 70 and 72 which serves to bar any passage outwardly from the valve stem entry zone 64. In addition, the increase in thickness (T) of the base provides a relatively stiffer bridging action of the tubular section 22 of the tire between the roll restraining hoops 26. Thus, together, these factors greatly increase the localized sealing action between the tire's base 16 and the supporting rim 36.

Pursuant to the present invention, the sealing ridges 68, 70 and 72 are formed integrally in the tire during the manufacturing process and are economical to produce. Moreover, the dimensions of the air inlet opening 32 do not have to be closely controlled since the valve stem is not sealingly secured thereto in any way. Further, because the valve stem is sealingly installed in the valve opening 46 after the tire is seated on the supporting rim 36, there is no problem of it being damaged. Thus, a relatively wide latitude of methods of assembling and disassembling the tire and rim may be envisioned, with the valve stem member being separately serviceable. In this regard, it is to be noted that the elastomeric conical head 58 of the valve stem member is larger than the diameter of the valve opening 46 so that it must be compressed during its installation. This may be achieved, for example, by coating the elastomeric head with a suitable lubricant, and inserting the valve stem member in a conical service tool, not shown. Subsequently, the valve stem member is forced radially outwardly from the service tool and into the opening aligned therewith, whereupon the rim is interengaged sealingly within the recess 62 of the valve stem member.

DESCRIPTION OF THE FIRST ALTERNATE EMBODIMENT

It is to be appreciated that one or more raised sealing devices with a geometric cross sectional profile other than that illustrated in FIGS. 1-4 are possible without departing from the spirit of the present invention. For example, FIG. 5 shows an alternate embodiment raised sealing device 75 having a single sealing ridge 76 of triangular cross-sectional shape with a sealing apex 78. Such sealing apex has a somewhat higher unit loading than that of the preferred embodiment because of its smaller contacting surface area, and may be quite satisfactory in certain applications. The reliability of the sealing device is, of course, enhanced by the inclusion of a second ridge 80 as shown in phantom which would be substantially parallel to the first ridge. Naturally, both ridges would be disposed in generally encircling relation to the air inlet passage 32 in a manner similar to the preferred embodiment.

With only one sealing ridge, however, it may be desirable to apply a nonbonding viscous sealant or sticky adhesive fully along the sealing device 75 and particularly to the radially inner portion of the ridge. Such a sealant would serve as a safety factor in that it would tend to block any potential leakage path caused by imperfections in the sealing ridge. Of course, with an increasing number of sealing ridges the need for the sealant decreases.

DESCRIPTION OF THE SECOND ALTERNATE EMBODIMENT

A second alternate raised sealing device or patch 82 is shown in FIG. 6 which is installed in an annular manner around the air inlet passage 32 by suitably bonding it to the rim mounting surface 18 of the tire's base 16. In the instant example, the bond-on patch has a rectangularly undulating sectional profile to provide three sealing ribs 84, 86 and 88 somewhat like the ridges 68, 70 and 72 of the preferred embodiment.

DESCRIPTION OF THE THIRD ALTERNATE EMBODIMENT

A third alternate raised sealing device 90 is shown in FIG. 7 wherein substantially concentric encircling grooves 92 are provided in the rim mounting surface 18 of the tire. These grooves are adapted to individually receive an endless seal ring 94 therein. Such economical and available seal rings serve as fluid dams, and can advantageously be made of an elastomeric material different from the tire's base 16 having the desired sealing qualities. It is recognized that this embodiment has the disadvantage of requiring greater care during the assembly of the tire on the supporting rim 36 in order to assure that the sealing rings are not dislodged from the recesses. Of course, a suitable adhesive could be applied to the recesses to better retain the rings therein.

DESCRIPTION OF THE FOURTH ALTERNATE EMBODIMENT

Referring now to FIG. 8, a raised sealing device 96 is shown as being undulatingly formed in the tire engaging surface 48 of the supporting rim 36. Advantageously, the relatively thin rim can be deformed to provide concentric sealing ridges 98, 100 and 102 which extend radially outwardly against the rim mounting surface 18 of the oval tire. Such construction is indicative of the principle that a raised sealing ridge should be associated with at least one of the surfaces 18 or 48 in order to assure positive localized sealing.

DESCRIPTION OF THE FIFTH ALTERNATE EMBODIMENT

Referring lastly to FIG. 9, another raised sealing device 104 is shown as including two pairs of parallel raised sealing strips 106 and 108 which are disposed on either side of the air inlet passage 32. Each of the sealing strips is formed in the tire in an elevated manner with respect to the rim mounting surface 18, and each extends axially between both of the roll restraining hoops 26. Preferably, a terminal end 110 of each strip extends axially to a point centrally overlapped by the hoops so that, in use, the sealing strips prevent circumferential leakage and the hoops prevent axial leakage of air from within the tire and outwardly between the tire and its supporting rim. As with the other embodiments described above this construction would allow split or multi-sectioned rims to be utilized without the potential problem of circumferential leakage to any gap therebetween.

In view of the foregoing, it is readily apparent that the localized raised sealing devices of the present invention serve to better prevent escape of air between the tire and rim at the valve stem entry zone 64. Further, the construction of the tire itself may be simplified, and a larger air inlet passage 32 can be provided which is particularly useful during the manufacturing thereof. Moreover, the valve stem member is a commercially available low cost item which can be serviced independently of the tire, and its convenient installation or removal allows the tire mounting or demounting procedure to be simplified.

While the invention has been described and shown with particular reference to a preferred and five alternate embodiments, it is apparent that additional variations may be possible that would fall within the scope of the present invention, which is not intended to be limited except as defined in the following claims.

What is claimed is:

1. A seal arrangement for an oval tire and rim comprising:
 a tubeless oval tire having an outer tread portion, a pair of sidewalls, and an annular base extending axially between said sidewalls, said annular base having a radially inner mounting surface and an air inlet passage therethrough leading to an internal air chamber;
 a supporting rim having a substantially cylindrical body portion and a radially outer mounting surface on said body portion disposed in facing relation with said inner mounting surface of said tire and with a valve opening therethrough alignable with said passage;
 a valve stem member extending through said valve opening and being sealed against the rim, said valve stem member being disposed substantially within said air inlet passage and spaced from said tire; and
 a sealing ridge associated with said inner mounting surface of said tire and encompassing said air inlet passage and being immediately adjacent thereto and of a construction sufficient for multiplying the effective unit loading between said tire and said rim caused by pressure in said chamber and for forming a seal therebetween immediately about said air inlet passage and said valve opening.

2. The seal arrangement of claim 1 wherein said sealing ridge is integrally formed in said inner mounting surface of said tire.

3. The seal arrangement of claim 1 further including a second sealing ridge which is disposed in generally concentric relation outwardly of said sealing ridge.

4. The seal arrangement of claim 3 wherein said sealing ridges are formed on a bond-on patch which is secured to the tire substantially concentrically about said air inlet passage.

5. The seal arrangement of claim 3 wherein said annular base of the oval tire has a tubular section of relatively uniform thickness, and wherein said sealing ridges present an overall thickness thereat greater than said uniform thickness.

6. The seal arrangement of claim 1 including a second sealing ridge spaced from said sealing ridge by a recess, each of said ridges having a substantially uniform cross section forming a closed loop sealing crest.

* * * * *